US006691233B1

(12) United States Patent
Gannage et al.

(10) Patent No.: US 6,691,233 B1
(45) Date of Patent: Feb. 10, 2004

(54) BATTERY OPERATED INK CAPTURE DEVICE THAT OPERATES IN A NORMAL POWER MODE DURING ACTIVE USE AND A MINIMUM POWER MODE DURING ABSENCE OF ACTIVE USE

(75) Inventors: Michel E. Gannage, Los Altos, CA (US); Venkata T. Gobburu, San Jose, CA (US); Nagesh Challa, Saratoga, CA (US); Charles A. Tracy, Modesto, CA (US)

(73) Assignee: ecrio inc., Cupertino, CA (US)

( * ) Notice: Subject to any disclaimer, the term of this patent is extended or adjusted under 35 U.S.C. 154(b) by 0 days.

(21) Appl. No.: 09/442,603

(22) Filed: Nov. 18, 1999

(51) Int. Cl.⁷ .................................. G06F 1/32
(52) U.S. Cl. ........................ 713/300; 713/320
(58) Field of Search .......................... 178/18.01, 19.01; 248/371; 250/559; 345/168, 173; 348/76; 380/241; 455/462, 754; 707/503; 708/141; 710/5; 713/300, 320; 725/119

(56) References Cited

U.S. PATENT DOCUMENTS

| 5,049,862 | A |   | 9/1991 | Dao et al. |
| 5,105,338 | A |   | 4/1992 | Held |
| 5,109,354 | A | * | 4/1992 | Yamashita et al. .......... 361/681 |
| 5,241,303 | A |   | 8/1993 | Register et al. |

(List continued on next page.)

FOREIGN PATENT DOCUMENTS

| EP | 0 615 209 A2 | 9/1994 |         |
| EP | 0 618 715 A1 | 10/1994 |        |
| EP | 0 641 095 A1 | 3/1995 |         |
| JP | 04196825 A * | 7/1992 | H04B/1/16 |

OTHER PUBLICATIONS

3Com Corporation, Palm Computing: Palm IIIx Connected Organizer, 1999.
British Telecommunications plc, Future Pen White Paper, 1999.
A.T. Cross Company, CrossPad Portable Digital Notepad, 1998.
Maxim Integrated Products, 3.3V/5V or Adjustable–Output Single–Cell DC–DC Converters MAX866/MAX867, 1996.
Novalog, Inc., Data Sheet: SIRComm Sirtel™ 115.2kbps IrDA® 1.2a Transceiver Module, Sep. 1998.
Texas Instruments, Inc., Data Sheet: TIR1000, TIR1000I Standalone IrDA™ Encoder and Decoder, May 1998.
Vishay Telefunken, Data Sheet: Integrated Interface Circuits: TOIM3232, Oct. 1998.

Primary Examiner—Thomas Lee
Assistant Examiner—Paul Yanchus, III
(74) Attorney, Agent, or Firm—Altera Law Group, LLC (57) ABSTRACT

A handwriting capture system includes a portable electronic tablet that capture pen strokes made on a standard pad of paper and transfer the captured pen strokes to a digital image capture device such as a personal data assistant or PDA using infrared communications circuitry. The portable electronic tablet is battery powered, and the handwriting capture system includes an infrared activated power switch to extend the useful lifetime of the battery by power up the electronic tablet and infrared communications circuitry only when the system is in use and otherwise by powering off the electronic tablet and much of the communications circuitry, in a manner that is entirely transparent to the user. An IR activity detector remains powered up when the system generally is powered off, and also furnishes power to at least the receiver section of the IR transceiver. When infrared activity occurs, the receiver section indicates that a signal has been received and the IR activity detector responds by signaling a switched power supply to apply normal operating power to the system.

7 Claims, 6 Drawing Sheets

U.S. PATENT DOCUMENTS

| | | | |
|---|---|---|---|
| 5,587,560 A | 12/1996 | Crooks et al. | |
| 5,629,499 A | 5/1997 | Flickinger et al. | |
| 5,682,113 A * | 10/1997 | Park et al. | 327/174 |
| 5,708,578 A * | 1/1998 | Stoddard et al. | 363/95 |
| 5,737,491 A * | 4/1998 | Allen et al. | 348/211.3 |
| 6,098,174 A * | 8/2000 | Baron et al. | 365/229 |
| 6,104,937 A * | 8/2000 | Fujimoto | 348/14.01 |
| 6,204,699 B1 * | 3/2001 | Shimazaki | 178/18.01 |
| 6,304,250 B1 * | 10/2001 | Yang et al. | 178/18.01 |
| 6,335,753 B1 * | 1/2002 | McDonald | 178/18.01 |
| 6,351,259 B2 * | 2/2002 | Breiner | 178/18.01 |
| 6,362,440 B1 * | 3/2002 | Karidis et al. | 178/18.01 |

\* cited by examiner

BATTERY OPERATED INK CAPTURE DEVICE THAT OPERATES IN A NORMAL POWER MODE DURING ACTIVE USE AND A MINIMUM POWER MODE DURING ABSENCE OF ACTIVE USE

BACKGROUND OF THE INVENTION

1. Field of the Invention

The present invention relates to power switches, and more particularly to infrared activated power switches.

2. Description of Related Art

Infrared communications circuitry which includes infrared transceivers and transmitters is integrated into a variety of battery operated devices ranging from computers and personal data assistants, or PDAs, to simple television remote control units. A variety of different types of devices contain infrared communications circuits. These integrated infrared communications circuits either are always on and have no power on/off capability, or are switched on and off either as the devices that incorporate them are switched on and off or independently of the devices that incorporate them but under their control, as with laptop computers and PDAs.

SUMMARY OF THE INVENTION

Advantageously, the present invention provides an infrared activated power switch that draws little power in the absence of infrared signal activity and is responsive to infrared signal activity to power up associated electronic circuitry.

One embodiment of the present invention is a battery operated ink capture device for operating in a minimum power dissipation mode in the absence of active use thereof, and in a normal power dissipation mode during active use thereof. The ink capture device comprises a battery voltage terminal; a switched power source having a control input, a power input, and a power output, the power output furnishing a normal operating voltage during the normal power dissipation mode and furnishing effectively a zero voltage during the minimum power dissipation mode; a digitizer having a power input coupled to the power output of the switched power source; a wireless communications port having a received signal output and a first power input, the first power input being coupled to the battery voltage terminal at least during the minimum power dissipation mode; and a communications activity detector having an input coupled to the received signal output of the wireless communications port, an output coupled to the control input of the switched power source, and a power input coupled to the battery voltage terminal at least during the minimum power dissipation mode.

Another embodiment of the present invention is a handwriting capture system operating in a minimum power dissipation mode in the absence of active use thereof, and in a normal power dissipation mode during active use thereof. The handwriting capture system comprises a battery voltage terminal; a switched power source having a control input, a power input, and a power output, the power output furnishing a normal operating voltage during the normal power dissipation mode and furnishing effectively a zero voltage during the minimum power dissipation mode; a digitizer tablet having a power input coupled to the power output of the switched power source and a digital signal output; a first infrared communications transceiver port including a first section having a received signal output and a first power input, and a second section coupled to the digital signal output of the digitizer and having a second power input, the first power input being coupled to the battery voltage terminal at least during the minimum power dissipation mode and the second power input being coupled to the power output of the switched power source; a communications activity detector having an input coupled to the received signal output of the infrared communications transceiver port, an output coupled to the control input of the switched power source, and a power input coupled to the battery voltage terminal at least during the minimum power dissipation mode; and a digital image capture device having a second infrared communications transceiver port, the second communications port being disposed within range of the first communications port.

Yet another embodiment of the present invention is a method of controlling power applied to a handwriting capture system comprising a battery operated ink capture device and a battery operated image capture device having a wireless link therebetween. The method comprises applying power to a subset of circuits in the ink capture device, the subset comprising a wireless receiver in the ink capture device and excluding a digitizing tablet in the ink capture device; communicating an activation signal from the image capture device to the ink capture device; detecting the activation signal in the wireless receiver of the ink capture device; and applying power to the entire ink capture device in response to the detecting step.

DETAILED DESCRIPTION OF THE PREFERRED EMBODIMENT

Figure 1:
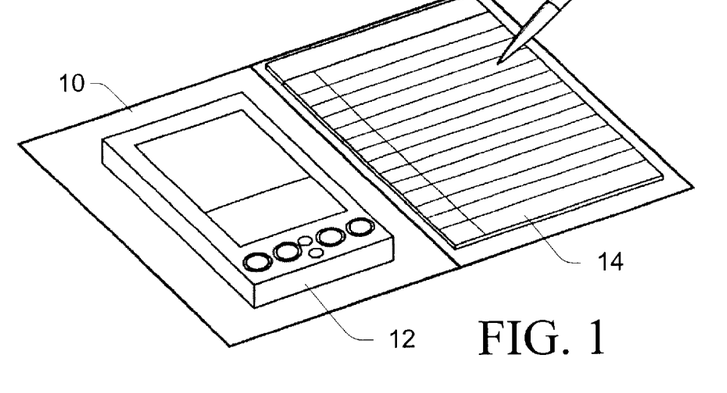
FIG. 1 is a perspective view of a handwriting capture system having an infrared activated power switch that is activated by a personal data assistant.
Figure 2:
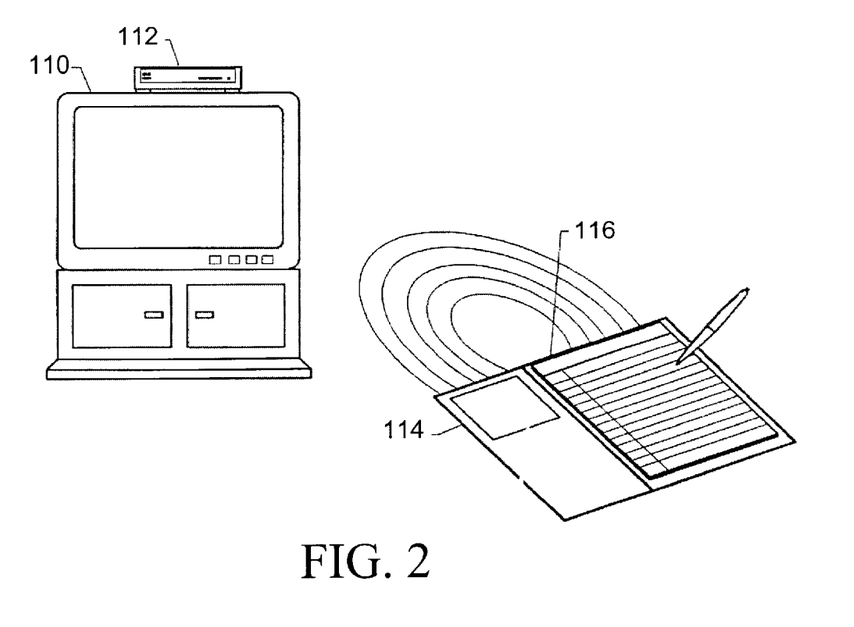
FIG. 2 is a perspective view of a handwriting capture system having an infrared activated power switch that is remotely activated by a set top box.

Electronic ink capture devices such as portable electronic tablets that capture pen strokes made on a standard pad of paper and transfer the captured pen strokes to a digital image capture device using a wireless technique such as RF or infrared communications are relatively inexpensive and are enormously convenient to users. Illustrative electronic writing tablets are shown in FIGS. 1 and 2. FIG. 1 shows a portfolio 10 that holds an electronic ink capture device 14 and a digital image capture device 12, illustratively one of the various popular PDAs of the Palm™ family of connected organizers, which are available from Palm Computing, Inc. of Santa Clara, Calif. An infrared link (not shown) is established in any convenient way between the electronic ink capture device 14 and the digital image capture device 12. FIG. 2 shows a single panel portfolio 114 that holds an electronic ink capture device 116. An infrared link is established with a remotely located set top box 112, which is conventionally cabled to a television 110. The set top box 112 functions as an image capture device.

As portable electronic ink capture devices such as 14 and 116 typically are battery powered, the useful lifetime of the battery may be extended by providing a switch to power up the device when in use and otherwise to power down the device. While a user operated switch may be provided, user convenience is further enhanced by providing an infrared activated power ON/OFF switch that automatically powers up and powers down the electronic ink capture device as need in a manner that is entirely transparent to the user. The digital image capture device turns the electronic ink capture device ON by generating IR activity when the user selects a writing application on the digital image capture device, and turns the electronic ink capture device OFF by ceasing IR activity when the user exits the application. To the user, the electronic ink capture device is always available. He or she simply selects an application on the digital image capture device and then picks up the pen and starts writing on the electronic ink capture device. The capture pen strokes can be viewed, stored, manipulated, and transferred electronically using the digital image capture device without an additional scanning step.

The electronic ink capture devices 14 and 116 are based on any suitable technology, such as, for example, electromagnetic position sensing technology as used in the Cross-Pad™ portable digital notepad, available from A.T. Cross Company of Lincoln, R.I., pressure sensitivity (resistivity) technology, ultrasonic, infrared, rf or laser tracking technologies, and spatial sensing technologies (e.g. accelerometers) as used in the Future Pen of British Telecommunications PLC, London, UK. The ink capture devices 14 and 116 present a writing surface that visually displays impressions made on it, the writing surface preferably being a removable paper writing surface so that the user experiences a comfortable and familiar feel of pen/pencil on paper as he or she writes with conventional ink. Alternatively, if a true "pen/pencil on paper" feel is not required or desired, any other surface and associated marking instrument for making visual perceivable impressions may be used. Examples of other suitable papers and inks include a whiteboard type surface where the ink is an erasable ink, and a plastic sheet that visualizes impressions by making contact with an underlying surface under the pressure of a stylus where the ink is the lines of contact between the plastic and the underlying surface. Digital image capture devices are presently available in a variety of different types. For example, a number of different types of personal data assistants (PDAs) running under proprietary operating systems or the Microsoft Windows CE™ operating system devices are available from various manufactures and are in widespread use today. While the handwriting capture system 210 described below includes a particular model of PDA, it will be understood that the electronic image capture device is not limited to that particular model or even type, but may be any type of device having image capture capabilities, including, for example, other types of PDAs, notebook computers, digital cameras, consumer wireless internet access devices ("CADs"), personal communication system ("PCS") multi-function wireless phones, computing or "smart" appliances, set top boxes, smart televisions, and so forth, and even more powerful and/or cost effective designs are expected to be developed. Various electronic ink capture devices and digital image capture devices are described in U.S. Pat. application Ser. No. 09/294,249, filed on Apr. 19, 1999 (Challa et al., Portfolio Apparatus for Portable Handwriting Capture) and in U.S. patent application Ser. No. 09/294,250, filed on Apr. 19, 1999 (Challa et al., Apparatus and Method for Portable Handwriting Capture) which are incorporated herein by reference in their entirety.

Figure 3:
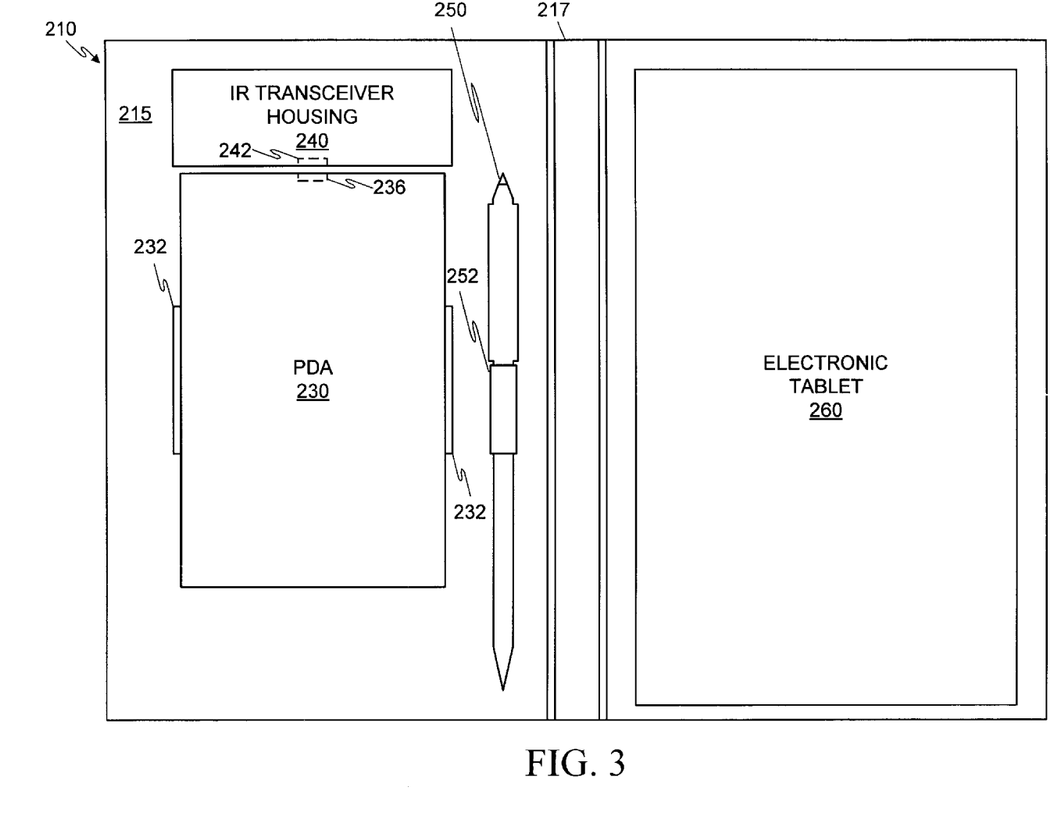
FIG. 3 is a schematic view of several elements of the handwriting capture system of FIG. 1.

FIG. 3 shows an illustrative handwriting capture system 210 which includes a PDA 230, an infrared transceiver housing 240, and an electronic tablet 260 mounted on respective panels of a bi-fold portfolio 215. Illustratively, the PDA 230 is, for example, one of the various popular PDAs of the Palm™ family of connected organizers, which are available from Palm Computing, Inc. of Santa Clara, Calif. The PDA 230 is retained on its section of the portfolio 215 by a retainer 232 in any suitable manner. Illustratively, the electronic tablet 260 is, for example, an electromagnetic type that includes an ordinary paper writing pad, an electromagnetic sensing array, and various control circuits, buffers, and a microprocessor (not shown). All components of the electronic tablet 260 are built into the portfolio 215 except for the writing pad, which is removable (to enable replacement) and overlays the sensing array. In the bi-fold arrangement shown in FIG. 1, each section of the portfolio 215 is rigid and hinged about a spine 217, which illustratively includes a compartment for batteries used to powering the electronic tablet 260, the infrared port in the IR transceiver housing 240, and other electronic components of the handwriting capture system 210 requiring power.

The PDA 230 includes an infrared port so that the electronic tablet 260 and the PDA 230 may communicate over preferably a bi-directional infrared link. The infrared link allows image data to be communicated from the electronic tablet 260 to the PDA 230, and various control and status signals to be communicated between the electronic tablet 260 and the PDA 230 for such purposes as, for example, querying portfolio battery life and identifying and testing the electronic tablet 260. The infrared port in the IR transceiver housing 240 includes an LED-photodiode assembly 242 positioned preferably opposite an LED-photodiode assembly 236 in the infrared port of the image capture device 230 as the later is retained in the portfolio 215. The handwriting capture system 210 may be used for external communications if desired by rotating the IR transceiver housing 240 so that the LED-photodiode assembly 242 faces out, or by including an additional LED-photodiode assembly (not shown) on any edge of the IR transceiver housing 240 facing away from the inside of the portfolio 215.

Any additional electronics needed for the infrared link (see, e.g., infrared interface 330 in FIG. 4) may be mounted either in the infrared transceiver housing 240 or in any other convenient place in the portfolio 215, including the spine 217. Connections between the circuits in the IR transceiver housing 240, the electronic tablet 260, the power supply in the spine 217, and any other related electronics is by any suitable low profile wiring such as, for example, commonly available flat ribbon cable. Although the LED-photodiode assemblies 236 and 242 need only be in line of sight, an adjacent relationship is preferred to avoid interference by intermittently intervening objects and other IR waves, and to minimize power requirements.

Figure 4:
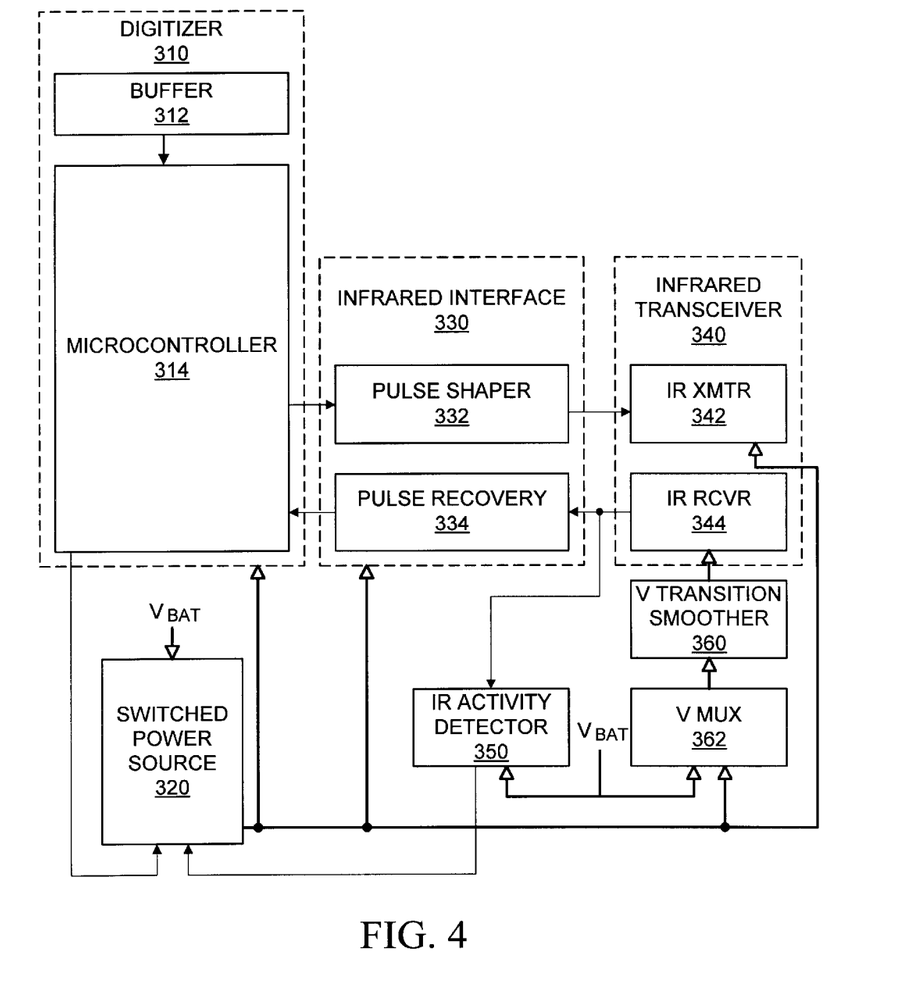
FIG. 4 is a schematic block diagram of infrared communications circuitry and associated digitizer circuitry having an infrared activity detector.

An illustrative circuit for realizing the infrared capabilities of the handwriting capture system 210 is shown in FIG. 4. A digitizer 310 includes buffer memory 312 and a microcontroller 314. The microcontroller 314 controls the assembly and timing of the digital signals that are sent to the PDA 230 through a pulse shaper 332 in an infrared interface 330 and an infrared transmitter 342 in an infrared transceiver 340, as well as the reconstruction and processing of digital signals that are received from the PDA 230 through an infrared receiver 344 in the infrared transceiver 340 and a pulse recovery circuit 334 in the infrared interface 330. Circuits for realizing the infrared interface 330 and the infrared transceiver 340 are well known in the art, and include, for example, the SIRComm™ SIRtel™ 115.2 kbps IrDA® 1.2a transceiver module available from Novalog, Inc. of Costa Mesa, Calif., and the type TOIM3232 IC pulse shaper, a type of ENDEC (encoder-decoder), available from Vishay Semiconductor GmbH of Hellbronn, Germany.

During periods of IR activity, a switched power source 320 furnishes power directly to the circuits of the digitizer 310, the circuits of the infrared interface 330, and the IR transmitter 342, and indirectly to the IR receiver 344 preferably through a voltage multiplexer 362 and a voltage transition smoothing circuit 360. The voltage multiplexer 362 is a type of voltage selector circuit that selects the greatest voltage applied to it at multiple inputs. The voltage transition smoother 360 preferably is included to prevent power cycling, as more fully explained below. The power source for the switched power source 320 preferably is $V_{BAT}$, which is the on-board power source for the handwriting capture system 210 and which illustratively is supplied by the batteries in the battery compartment of the handwriting capture system 210. Alternatively, power to the switched power source 320 may be furnished by another set of batteries, drawn from another device (for example, the PDA 230 in FIG. 3), or furnished by an AC-DC converter. While the switched power source 320 may be as simple as a transistor switch such as, for example, a FET transistor, a DC-DC converter that maintains a constant $V_{CC}$ voltage over the life of the batteries and that can be externally switched ON and OFF is preferred. A suitable switched DC-DC converter is type MAX866, which is available from Maxim Integrated Products. of Sunnyvale, Calif.

An IR activity detector 350 detects incoming infrared pulses and provides a control signal to the control input of the switched power source 320, in accordance with which the various circuits in the electronic tablet and associated infrared circuits are powered up. When power is OFF, $V_{BAT}$ is applied to the IR activity detector 350 and to the IR receiver 344 (illustratively through the voltage multiplexer 362 and the voltage transition smoothing circuit 360). Preferably the IR activity detector 350, the voltage multiplexer 362, and the voltage transition smoothing circuit 360 are designed to have extremely low power dissipation in the absence of IR activity, preferably essentially zero, so that in effect the power dissipation of the entire handwriting capture system 210 in the absence of IR activity is limited to the power dissipation of the IR receiver 344. The aforementioned Novalog transceiver module draws 100 $\mu$A of current when powered by two 1.5 volt AAA batteries (which unavoidably also includes some of transmitter circuits that are internally connected to the same power bus as the receiver circuits), so that a handwriting capture system 210 that uses the Novalog transceiver draws less than about 300 $\mu$W. The use of another type of transceiver module would likely alter the power dissipation of the handwriting capture system 210 during no IR activity periods, either causing a greater or lesser dissipation. It will be appreciated that if the transceiver 340 is implemented in separate transmitter and receiver modules, only the receiver module need receive power during the system power off state so that the power dissipation of the handwriting capture system 210 during no IR activity periods may be further reduced.

When IR activity occurs, the IR activity detector 350 responds by signaling the switched power source 320 to turn ON, thereby causing power to be applied to the digitizer 310, the infrared interface 330, the IR transmitter section 342 of the IR transceiver 340, and the IR receiver section 344 of the IR transceiver 340 (through the voltage multiplexer 362 and the voltage transition smoother 360).

If desired, an entirely separate infrared communications port may be dedicated to detecting IR activity. A suitable separate port uses a photodiode powered by $V_{BAT}$ and having its output connected to the IR activity detector 350. Alternatively, if the design of the IR transceiver module permits, the photodiode therein may be powered apart from the transceiver circuits and its output connected to the IR activity detector 350 as well as to the transceiver circuitry. In this way, the transceiver circuits may be completely powered OFF during periods of no IR activity, $V_{BAT}$ may be applied directly to the photodiode, and the output of the photodiode may be monitored directly by the IR activity detector 350. Since the photodiode may be designed to have essentially zero power dissipation in the absence of IR activity, a handwriting capture system 210 using this type of separate photodiode design has essentially zero power dissipation in the absence of IR activity.

If desired, the IR activity detector 350 may also be used for controlling the removal of power from the various circuits in the electronic tablet and associated infrared circuits in the absence of IR activity. Additionally or alternatively, the microcontroller 314 may be used for controlling the removal of power from the various circuits in the electronic tablet and associated infrared circuits. When the ON/OFF condition of the switched power source 320 is controlled by more that a single control line, as in FIG. 4 which shows control lines from the microcontroller 314 and from the IR activity detector 350, the switched power source 320 also includes suitable logic for applying the control signals from the control lines in the desired manner.

In the handwriting capture system 210, the circuit for implementing the IR activity detector 350 preferably is located in the electronic tablet 260 and the voltage transition smoothing circuit 360 and the voltage multiplexer circuit 362 are located in the IR transceiver housing 240, although each may be located in any suitable part of the handwriting capture system 210 including the IR transceiver housing 240, the electronic tablet 260, the spine 217, and the leaves of the portfolio 215.

Control of the switched power source 320 generally proceeds in the context of the handwriting capture system 210 of FIG. 3 as described in the following illustrative example. When the user wishes to take notes, the user opens an ink capture application on the PDA 230 and simply writes on the electronic tablet 260 whenever he or she desires while the application is open. Transparently to the user, the tablet 260 had been powered OFF automatically by the IR activity detector because no ink capture application had been active. The circuits of the digitizer 310, the circuits of the infrared interface 330, and the IR transmitter 342 are powered OFF. However, the open ink capture application causes the PDA 230 to generate IR activity. The IR activity is detected by the IR activity detector 350, which signals the switched power source 320 to power up, thereby applying $V_{CC}$ to the circuits of the digitizer 310, the infrared interface 330, and the infrared transceiver 340 (to the IR receiver 344 through the voltage multiplexer circuit 362 and the voltage transition smoother 360). These circuits remain fully powered up while IR activity occurs.

Each instance of IR activity by the PDA 230 may include one or more commands. When awaken, the electronic tablet 260 responds to commands from the PDA 230. One such command may require the electronic tablet 260 to return certain information about itself, such as manufacturing information, battery condition, and tablet ready status. Another command, or perhaps even the same command, may require the electronic tablet 260 to transmit any pen strokes being made by the user to the PDA 230. The pen stroke data continues for as long as the pen stroke is being made, with each data packet being acknowledged by the host and each acknowledgement being detected as IR activity by the IR activity detector 350.

The switched power source 320 may be turned OFF in a variety of different ways to power down the circuit of FIG. 4. One way is for the microcontroller 314 to control shut off exclusively. Illustrative circumstances under which the microcontroller 314 may be used to control shut off are (1) when the user exits a software application on the host (e.g. the PDA 230); (2) when the user explicitly commands the host to power down the circuit of is FIG. 4; and (3) when no pen strokes have been made over a particular period of time such as, for example, five or ten minutes. In cases "(1)" and "(2)," the host sends a command to the digitizer 310 over the IR link and the microcontroller 314 in turn sends a control signal to turn OFF the switched power source 320. In case "(3)," the microcontroller 314 in the digitizer 310 performs the time determination and sends a control signal to turn OFF the switched power source 320 when appropriate. Another way is for the IR activity detector 350 to control shut off exclusively. Illustratively, circuits within the IR activity detector 350 may be designed to maintain an ON control signal to the switched power source 320 for a period of time after IR activity has ceased, at which time the IR activity detector 350 generates an OFF control signal. A third illustrative way is for the microcontroller 314 and the IR activity detector 350 to control shut off jointly. Suitable logic is included in the switched power source 320 to apply signals from the microcontroller 314 and the IR activity detector 350 as an ON/OFF signal, the design thereof being within the skill of one of ordinary skill in the art.

Hardware Circuitry

Figure 5:
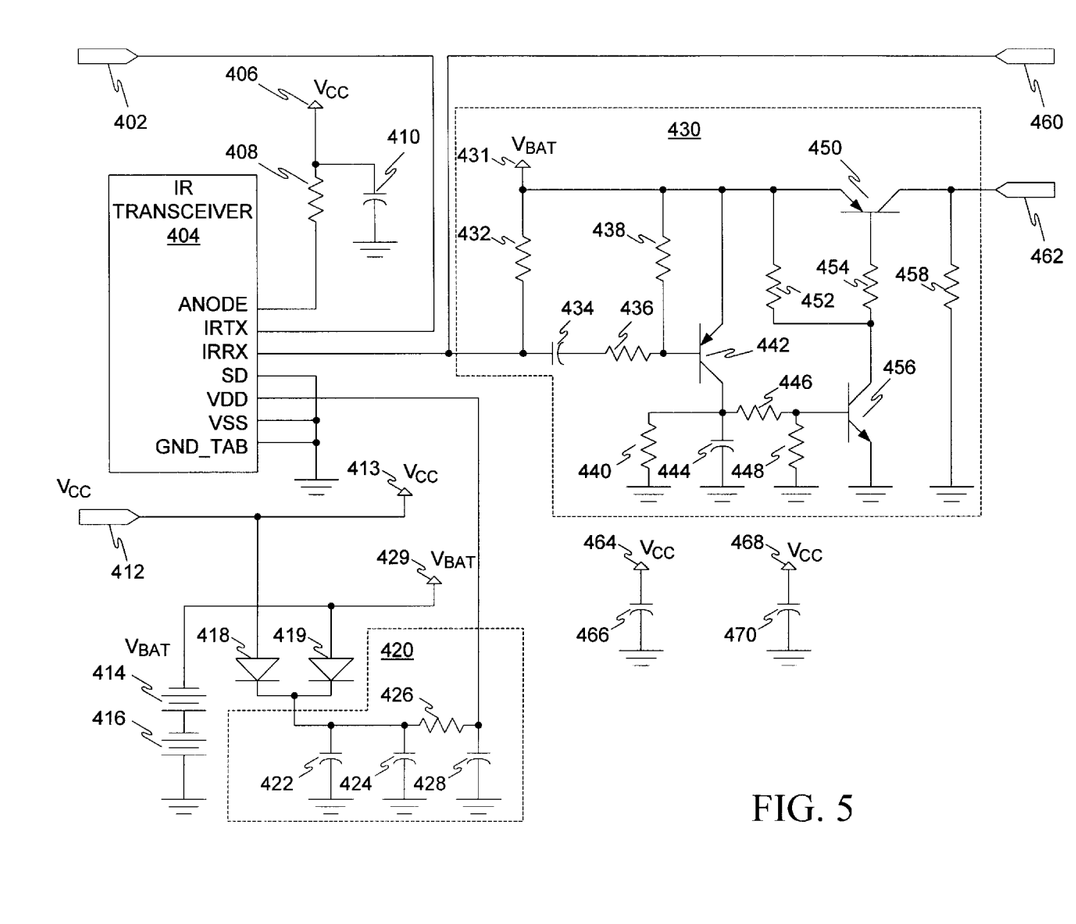
FIG. 5 is a component level circuit diagram of an infrared activity detector and a voltage transition smoothing circuit.

FIG. 5 is a detailed circuit diagram of one type of voltage transition smoothing circuit 420 and one type of IR activity detector circuit 430. Batteries 414 and 416 ($V_{BAT}$) are preferably two AAA batteries which power not only the circuits of FIG. 5 but also the s circuit elements in the electronic tablet 260 and the IR transceiver housing 240 through the switched power source 320. $V_{BAT}$ is present at points 429 and 431 in FIG. 5. The voltage $V_{CC}$ applied at terminal 412 is, illustratively, the voltage from the aforementioned MAX866 DC-DC converter. $V_{CC}$ is present at points 406, 413, 464 and 468 in FIG. 5.

The infrared transceiver integrated device 404 includes a transmitter section having an input IRTX connected to an IR transmit terminal 402, and a receiver section having an output IRRX connected to an IR receive terminal 460. The transceiver 404 is always ON, being powered from the two "AAA" batteries 414 and 416 when IR activity is absent and otherwise by the 3.3 volt $V_{CC}$ potential from the switched power supply 320. One of the diodes 418 and 420 connected as a common cathode diode pair passes the supply with the higher voltage. The transmitter section of the transceiver 404 is disabled during the power off state because an anode resistor 408 for the transmitter section of the transceiver 404 is connected to the switched power source at 406, which is at zero potential during shutdown.

IR activity detection circuitry. The power-on sequence is a series of infrared pulses generated by the PDA 230, for example, and received by the IR transceiver 404, for example. The resulting initiation pulses are stretched to control the ON/OFF state of a pnp transistor 450. When IR activity is present, the transistor 450 is ON and voltage $V_{BAT}$ appears on control terminal 462, which causes the switched power source 320 to assert $V_{CC}$ at its output. When IR activity is absent for some time, the transistor 450 is OFF and the terminal 462 is discharged to ground through resistor 458, which causes the switched power source 320 to assert zero volts at its output. It will be appreciated that the transistor 450 preferably consumes power only during periods of infrared activity, to avoid unnecessary drain on the batteries 414 and 416. The duration of the initialization pulses preferably exceeds the duration of the initialization time for the electronic tablet 260.

The power-up sequence of the electronic tablet 260 starts with the reception of an infrared signal by the transceiver 404. The receiver output IRRX of the transceiver 404 changes from a high state, or $V_{BAT}$, to a low state, which is near zero. The output IRRX remains low for a specified period, illustratively ³⁄₁₆ths of the transmission bit frequency rate if the received bit is a "0", otherwise it stays at a "1" level. Note that the start bit of any byte is always a "0" for the asynchronous protocol underlying the Physical Layer of the IR communication protocol. The IRRX output high-to-low transition turns ON pnp transistor 442 through capacitor 434 and resistor 436. The transistor 442 amplifies the input current, which causes capacitor 444 to quickly charge to a level just below $V_{BAT}$. The capacitor 444 is sufficiently charged by just one bit of IR activity. An npn transistor 456 starts to conduct as soon as the voltage on the capacitor 444 surpasses the forward bias voltage of the transistor 456. This in turn turns ON the transistor 450, which is the ON/OFF switch. Conduction through the transistor 450 when IR activity is detected asserts $V_{BAT}$ on the control terminal 462. The switched power supply 320 (FIG. 4) turns ON and generates a constant $V_{CC}$ potential of 3.3 volts, which is applied at switched power terminal 412.

The active output on the transistor 450 during IR activity is maintained by the reservoir charge in the capacitor 444 between infrared pulses. A full charge on the capacitor 444 maintains an active switch condition for about 3.0 ms after the last infrared pulse is received. The longest infrared pulse null period at the data transfer rate of 19.2K baud is around 500 us with a worst case bit pattern of all FFs. Preferably, extra margin is designed in to allow for lower communication rates, part tolerances, and part temperature drifts.

The discharge of capacitor 444 can be used as a timer for the detection of no IR activity. This can be done by either increasing the value of the capacitor 444 or increasing the value of the discharge resistor network 440/446/448. A suitable period of time would range from a minute or two to about ten minutes.

While the IR activity detection circuit 430 uses a pulse stretching technique to control the ON/OFF transistor 450, a variety of other circuits such as digital latches and monostable multivibrators may be used if desired. Moreover, IR activity detection circuits may be implemented in CMOS or bipolar technologies, although bipolar is preferred because bipolar transistors draw essentially no current when not conducting and are widely available as discrete components.

Power cycling suppression circuitry. The pulse stretching technique has a potential problem at power off when the batteries 414 and 416 are less than their full potential yet still within their specified operational range. Just before power off is initiated after a period of no infrared signal activity, the receiver output IRRX of the transceiver 404 is at $V_{CC}$, which is 3.3 volts as applied by the switched power supply 320 to the chip power input $V_{DD}$. However, when $V_{CC}$ is absent during the power off state, the input $V_{DD}$ is obtained from voltage $V_{BAT}$, which is the voltage across the batteries 414 and 416. The voltage $V_{BAT}$ varies, depending on the condition of the batteries 414 and 416. The normal difference between $V_{CC}$ and $V_{BAT}$ may be as much as 1.3 volts ($V_{CC} - V_{BAT}$ or 3.3 V–2.0 V), thereby causing the receiver output IRRX of the transceiver 404 to change as much as much as 1.3 volts between the ON state and the OFF state when the batteries 414 and 416 are at their low voltage threshold. The 1.3 volt transition is coupled through the capacitor 434 and is sufficient under some circuit conditions to mimic an infrared signal, so that the switch status terminal 462 could activate the switched power supply 320 even though no IR activity has actually occurred. As the period of no infrared activity continues, the switched power supply 320 is again shut down, once again causing the voltage drop from $V_{CC}$ to $V_{BAT}$ at the transceiver output IRRX and once again falsely signaling that IR activity has occurred. This cycle repeats itself until the batteries 414 and 416 die.

To solve the problem of power cycling, the circuit providing the power input $V_{CC}$ to the transceiver 404 is provided with the voltage transition smoothing circuit 420. The voltage transition smoothing circuit 420 functions to reduce the speed of the $V_{CC}$ to $V_{BAT}$ voltage transition at power off. One suitable transition speed reduction circuit is a simple RC network as shown in FIG. 5, although similar functionality may be realized with other circuits such as a low pass filter. Illustratively, the RC network of FIG. 5 includes a capacitor 424 and a resistor 426, and operates as follows. The capacitor 424 charges to almost $V_{CC}$ during the power on state through diode 418. When the power off state is initiated, $V_{CC}$ drops to zero but power is now supplied by the batteries 414 and 416 through the diode 419. The diodes 418 and 419 pass power from either the switched power terminal 412 or the batteries 414 and 416, whichever is greater, and prevent the capacitor 424 from discharging through the power sources. Instead, the capacitor 424 discharges slowly to the $V_{BAT}$ voltage level through the resistor 426 and port $V_{DD}$ of the transceiver 404, and this slow change restricts the power coupling through the capacitor 434 to a level that avoids triggering a false activation signal in the IR activity detection circuit 430. In effect, the common cathode connected diodes 418 and 419 act as a voltage multiplexer. Alternative circuits to implement a voltage multiplexer can be used, including voltage mutliplexers implemented with transistors.

Miscellaneous. Resistors 438 and 448 provide discharge paths for the accumulated charges on the bases of the transistors 442 and 456 respectively. Resistor 432 is used for open-collector output transceivers. Resistor 408 is the current limiting resistor of the light emitting transmit diode. Resistor 458 limits the shutdown time that otherwise would be dependent on the input impedance connected to the switch status terminal 462. Resistor 452 is a charging resistor, resistors 454 and 446 are base resistors, and resistor 440 is a discharge resistor for capacitor 444. Capacitors 410, 422, 428, 466 and 470 remove high frequency noise on the power circuits. In the IR transceiver 404, ports SD, $V_{SS}$, and GND-TAB are tied to ground.

Table 1 contains illustrative values for the various components of the circuit of FIG. 5. It will appreciated that these values as well as the particular circuit configurations are illustrative, and that variations thereof that perform the essential functionality are within the ability of a person of ordinary skill in the art.

TABLE 1

| Resistors | Ω |
|---|---|
| 408 | 68 |
| 426 | 300 |
| 432 | 120 |
| 436 | 10.0K |
| 438 | 100K |
| 440 | 170K |
| 446 | 220K |
| 448 | 220K |
| 452 | 120K |
| 454 | 220K |
| 458 | 100K |

| Capacitors | μF |
|---|---|
| 410 | 10.0 |
| 422 | 0.1 |
| 424 | 10.0 |
| 428 | 0.1 |
| 434 | 0.01 |
| 444 | 0.015 |
| 466 | 0.01 |
| 470 | 0.01 |

| Transistors | Type |
|---|---|
| 442 | 2N3906 |
| 450 | 2N3904 |
| 456 | 2N3906 |

| Diodes | Type |
|---|---|
| 418 | BAS 70 |
| 419 | BAS 70 |

Communications Protocol Description

This section describes an illustrative communications protocol. Variations of this protocol as well as different protocols may be used if desired.

The infrared transceivers and decoders follow the IrDA-SIR specifications for the physical layer. The communication protocol's command structure is unique and does not follow the IrDA-SIR specifications. In the following description, the digital image capture device is referred to as Host, and the ink capture device is, illustratively, an Electronic Tablet.

Figure 6:
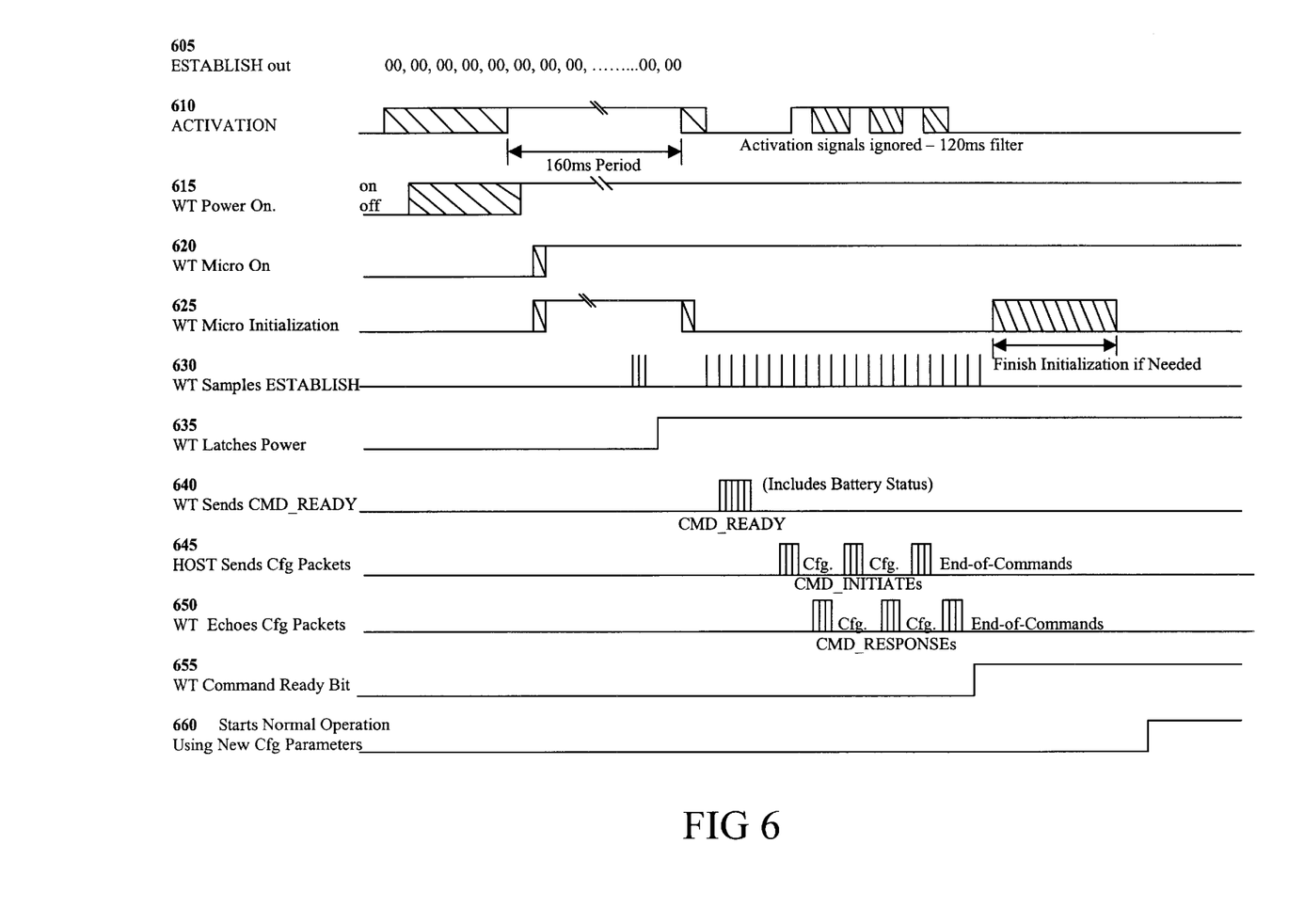
FIG. 6 is a set of waveform diagrams for the power-up command transfer operations of a handwriting capture system having an infrared activated power switch.

The Host initiates all command transfers. The Electronic Tablet requests configuration refresh by clearing a READY status bit that is embedded in all pen vector packets. Commands can be initiated by the Host while the Electronic Tablet in the power off, standby, or active state. The communication structure is the same for all three states, and is shown in FIG. 6 for the power-up command transfer, and in FIG. 7 for the operational command transfer.

Figure 7:
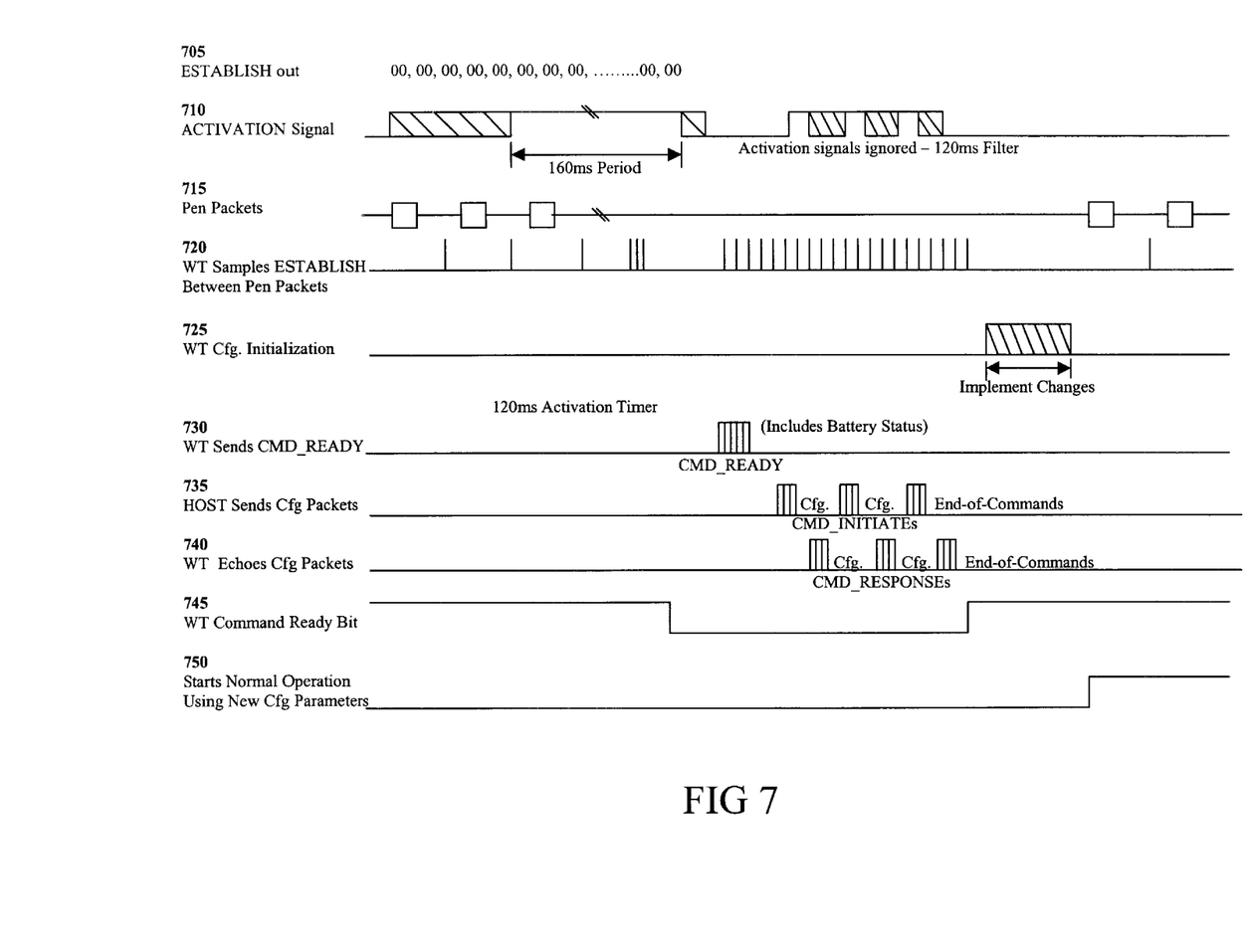
FIG. 7 is a set of waveform diagrams for the command transfer operations of a handwriting capture system having an infrared activated power switch.

Establishment Phase. Commands are always initiated by the Host. The Host sends an ESTABLISH packet to the Electronic Tablet (strings 605 and 705). The ESTABLISH packet is a string of consecutive NULL character (0x00) lasting for 160 ms.

The ESTABLISH packet is converted into a dual purpose signal called an ACTIVATION signal by the infrared activation circuitry. This ACTIVATION signal (waveforms 610 and 710) enables the power supply of the Electronic Tablet if it is off (waveform 615) and turns on and initializes the microcontroller (waveforms 620 and 625), and flags the Electronic Tablet to enter a command transfer mode. The Electronic Tablet is monitors the ACTIVATION line at least once every 120 ms (waveforms 630 and 720), operating between pen packets (waveform 715) if necessary. The discovery of an enabled ACTIVATION line signals the Electronic Tablet to change into the command response mode.

When in command response mode, the Electronic Tablet first verifies the validity of the ACTIVATION signal by accepting only activation signals that remain on three consecutive samples taken 5 ms apart (waveforms 630 and 720). When the Electronic Tablet is going from a power off to a power on state, the Electronic Tablet must finish the validation phase and enable it's own power latch circuit (waveform 635) before the Host stops sending the ACTIVATION stream.

The Electronic Tablet then waits for the ACTIVATION signal to go inactive. The Electronic Tablet again verifies the level change by requiring an inactive level on three consecutive samplings spaced 5ms apart (waveforms 630 and 720), and then transmits a CMD_READY packet (waveforms 640 and 730), which contains Electronic Tablet manufacturing information such as software revision, hardware type, product ID, customer ID, and the tablet's battery and ready status. The transmission of the CMD_READY packet to the Host signals the end of the establishment phase.

Command Transfer. The reception of the CMD_READY packet by the Host signals the commencement of the command transfer phase. The Host notes the battery level, and proceeds in all cases except for an exhausted battery condition, which is an error condition, by returning a CMD_INITIATE packet (waveforms 645 and 735) no sooner than 5 ms and no later than 10 ms from the reception of the last CMD_READY packet. This command packet is a multiple byte command structure with a unique first byte pattern indicating the command packet type.

The Electronic Tablet monitors the ACTIVATION line between command exchanges (waveforms 635 and 720), but only reverts to the establishment phase if the signal remains active for greater than 120ms after the last valid command transfer.

Acknowledgment. The Electronic Tablet acknowledges the reception of the command packet by echoing the command information back to the Host (waveforms 650 and 740). The first byte CMD_INITIATE type pattern is replaced with a CMD_RESPOND pattern. The echo starts no sooner 5ms after the reception of the checksum byte, and no later than 10 ms. The checksum position is determined through the command type and counting the data bytes or watching the synchronization bits seven and six. It is preferable to use both methods.

Validation. The Host waits for the return of its last command. The integrity of the command is verified by comparing the returned packet to the sent packet taking in account the expected change to the first byte from the initiate to the response packet type. Any errors would trigger an error response that involves retransmissions The reception of a valid command packet by the Electronic Tablet resets its 120 ms ACTIVATION signal's filter.

Multiple Command Transfers. The Host continues the command transfer cycle until all configuration parameters have been set. There is a minimum delay of 5 ms and a maximum delay of 10 ms from the reception of the last command and the start of the next command.

Activation. The command transfer phase is terminated by the transmission of the End-of-Commands packet. Immediately after echoing the command back to the Host, the Electronic Tablet finishes any left over initialization (waveforms 625 and 725) and then starts normal operation using the new parameters passed in the preceding transfer phase (waveforms 660 and 750). The "Command Ready Bit" is set high (waveforms 655 and 745).

The description of the invention set forth herein is illustrative and is not intended to limit the scope of the invention as set forth in the following claims. Variations and modifications of the embodiments disclosed herein are possible, and alternatives and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. A battery operated ink capture device for operating in a minimum power dissipation mode in the absence of active use thereof, and in a normal power dissipation mode during active use thereof, comprising:

a battery voltage terminal;

a switched power source having a control input, a power input, and a power output, the power output furnishing a normal operating voltage during the normal power dissipation mode and furnishing effectively a zero voltage during the minimum power dissipation mode;

a digitizer having a power input coupled to the power output of the switched power source;

a wireless communications port having a received signal output and a first power input;

a communications activity detector having an input coupled to the received signal output of the wireless communications port, an output coupled to the control input of the switched power source, and a power input coupled to the battery voltage terminal at least during the minimum power dissipation mode; and a voltage selection circuit having a first voltage input terminal coupled to the battery voltage terminal, a second voltage input terminal coupled to the power output of the switched power source, and a voltage output coupled to the first power input of the wireless communications port, the first power input of the wireless communications port being coupled to the battery voltage terminal through the first voltage input terminal of the voltage selection circuit during the minimum power dissipation mode, and coupled to the power output of the switched power source through the second voltage input terminal of the voltage selection circuit during the normal power dissipation mode;

wherein the voltage selection circuit comprises a first diode having an anode and a cathode, and a second diode having an anode and a cathode, the respective cathodes of the first and second diode being connected together, the anode of the first diode being the first voltage input terminal of the voltage selection circuit, and the anode of the second diode being the second voltage input terminal of the voltage selection circuit.

2. A battery operated ink capture device for operating in a minimum power dissipation mode in the absence of active use thereof, and in a normal power dissipation mode during active use thereof, comprising:

a battery voltage terminal;

a switched power source having a control input, a power input, and a power output, the power output furnishing a normal operating voltage during the normal power dissipation mode and furnishing effectively a zero voltage during the minimum power dissipation mode;

a digitizer having a power input coupled to the power output of the switched power source;

a wireless communications port having a received signal output and a first power input;

a communications activity detector having an input coupled to the received signal output of the wireless communications port, an output coupled to the control input of the switched power source, and a power input coupled to the battery voltage terminal at least during the minimum power dissipation mode;

a voltage selection circuit having a first voltage input terminal coupled to the battery voltage terminal, a second voltage input terminal coupled to the power output of the switched power source, and a voltage output coupled to the first power input of the wireless communications port, the first power input of the wireless communications port being coupled to the battery voltage terminal through the first voltage input terminal of the voltage selection circuit during the minimum power dissipation mode, and coupled to the power output of the switched power source through the second voltage input terminal of the voltage selection circuit during the normal power dissipation mode; and a voltage transition smoothing circuit, the first power input of the wireless communications port being coupled to the voltage output of the voltage selection circuit through the voltage transition smoothing circuit.

3. A battery operated ink capture device as in claim 2 wherein the voltage transition smoothing circuit comprises a resistor-capacitor network.

4. A battery operated ink capture device as in claim 2 wherein the voltage transition smoothing circuit comprises a low pass filter.

5. A battery operated ink capture device for operating in a minimum power dissipation mode in the absence of active use thereof, and in a normal power dissipation mode during active use thereof, comprising:

a battery voltage terminal;

a switched power source having a control input, a power input, and a power output, the power output furnishing a normal operating voltage during the normal power dissipation mode and furnishing effectively a zero voltage during the minimum power dissipation mode;

a digitizer having a power input coupled to the power output of the switched power source;

a wireless communications port having a received signal output and a first power input, the first power input being coupled to the battery voltage terminal at least during the minimum power dissipation mode;

a communications activity detector having an input coupled to the received signal output of the wireless communications port, an output coupled to the control input of the switched power source, and a power input coupled to the battery voltage terminal at least during the minimum power dissipation mode; and an infrared transceiver module;

wherein the wireless communications port further comprises a second power input, a receiver section, and a transmitter section;

the receiver section includes the first power input to the wireless communications port and the transmitter section includes the second power input to the wireless communications port; and the second power input to the wireless communications port is coupled to the power output of the switched power supply; and wherein the receiver section and the transmitter section are sections of the transceiver module;

the first power input of the wireless communications port is $V_{DD}$; and the second power input of the wireless communications port is ANODE.

6. A battery operated ink capture device for operating in a minimum power dissipation mode in the absence of active use thereof, and in a normal power dissipation mode during active use thereof, comprising:

a battery voltage terminal;

a switched power source having a control input, a power input, and a power output, the power output furnishing a normal operating voltage during the normal power dissipation mode and furnishing effectively a zero voltage during the minimum power dissipation mode;

a digitizer having a power input coupled to the power output of the switched power source;

a wireless communications port having a received signal output and a first power input, the first power input being coupled to the battery voltage terminal at least during the minimum power dissipation mode; and a communications activity detector having an input coupled to the received signal output of the wireless communications port, an output coupled to the control input of the switched power source, and a power input coupled to the battery voltage terminal at least during the minimum power dissipation mode; wherein the communications activity detector comprises:

a pulse extension circuit having an input and an output, the input of the communications activity detector being the input of the pulse extension circuit; and a transistor switch having first and second controlled terminals and a control terminal, the first controlled terminal being coupled to the power input of the communications activity detector, the second controlled terminal being coupled to the output of the communications activity detector, and the control terminal being coupled to the output of the pulse extension circuit.

7. A handwriting capture system operating in a minimum power dissipation mode in the absence of active use thereof, and in a normal power dissipation mode during active use thereof, comprising:

a battery voltage terminal;

a switched power source having a control input, a power input, and a power output, the power output furnishing a normal operating voltage during the normal power dissipation mode and furnishing effectively a zero voltage during the minimum power dissipation mode;

a digitizer tablet having a power input coupled to the power output of the switched power source and a digital signal output;

a first infrared communications transceiver port including a first section having a received signal output and a first power input, and a second section coupled to the digital signal output of the digitizer and having a second power input, the first power input being coupled to the battery voltage terminal at least during the minimum power dissipation mode and the second power input being coupled to the power output of the switched power source;

a communications activity detector having an input coupled to the received signal output of the infrared communications transceiver port, an output coupled to the control input of the switched power source, and a power input coupled to the battery voltage terminal at least during the minimum power dissipation mode; and a digital image capture device having a second infrared communications transceiver port, the second communications port being disposed within range of the first communications ports;

wherein the switched power source comprises a DC-DC converter;

the communications activity detector comprises a pulse extension circuit and a transistor switch coupled to the pulse extension circuit; and the digital image capture device is a personal data assistant.

* * * * *